(12) United States Patent
Fondriest (10) Patent No.: US 7,560,828 B2
(45) Date of Patent: Jul. 14, 2009

(54) MODULAR ELECTRICAL HARNESS FOR MILITARY VEHICLES ADAPTED WITH THE MULTIPLE INTEGRATED LASER ENGAGEMENT SYSTEM

(76) Inventor: William Fondriest, 1270 Biscayne Blvd., #4, Deland, FL (US) 32724

( * ) Notice: Subject to any disclaimer, the term of this patent is extended or adjusted under 35 U.S.C. 154(b) by 279 days.

(21) Appl. No.: 11/599,538

(22) Filed: Nov. 14, 2006

(65) Prior Publication Data

US 2007/0221394 A1    Sep. 27, 2007

Related U.S. Application Data

(63) Continuation-in-part of application No. 10/693,801, filed on Oct. 24, 2003, now Pat. No. 7,135,790.

(51) Int. Cl.
 *B60L 1/00* (2006.01)
(52) U.S. Cl. ...................................... 307/9.1
(58) Field of Classification Search ............ 307/9.1
 See application file for complete search history.

(56) References Cited

U.S. PATENT DOCUMENTS

| 5,507,668 | A | * | 4/1996 | Lambrinos et al. | .......... 439/502 |
|---|---|---|---|---|---|
| 5,829,129 | A | | 11/1998 | Ito | |
| 5,831,198 | A | | 11/1998 | Turley | |
| 5,869,907 | A | | 2/1999 | Marler | |
| 6,291,770 | B1 | | 9/2001 | Casperson | |
| 6,293,141 | B1 | | 9/2001 | Nance | |
| 6,504,730 | B1 | | 1/2003 | Cooney | |
| 6,577,025 | B2 | | 6/2003 | Hentschel | |
| 2003/0016520 | A1 | | 1/2003 | Cooney | |

* cited by examiner

*Primary Examiner*—Robert L. DeBeradinis
(74) *Attorney, Agent, or Firm*—Malin Haley DiMaggio Bowen & Lhota, P.A.

(57) ABSTRACT

A modular vehicle cable system for adapting military vehicles with the MILES 2000 Multiple Integrated Laser Engagement System used by the United States Armed Forces and other armed forces around the world for training purposes is disclosed. A modular vehicle cable system is provided to allow the user the ability to troubleshoot, remove, and replace certain sections of the system quicker and easier than previously allowed. The design also allows for the installation of additional systems with only minor modifications. The modular vehicle cable system not only makes a cable system more reliable through inherent design, but also allows the user the ability to remove and replace a specific portion of a cable system without disrupting the other systems associated with a cable system. The modular nature of the cable system reduces maintenance and repair times by enabling rapid diagnosis and replacement of defective cable components and sections thereby maximizing training exercises by minimizing vehicle down time.

9 Claims, 6 Drawing Sheets

MODULAR ELECTRICAL HARNESS FOR MILITARY VEHICLES ADAPTED WITH THE MULTIPLE INTEGRATED LASER ENGAGEMENT SYSTEM

CROSS REFERENCE TO RELATED APPLICATIONS

This application is a continuation-in-part of U.S. patent application Ser. No. 10/693,801, filed on Oct. 24, 2003, now U.S. Pat. No. 7,135,790.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. M67854-05-C-8009, dated Mar. 23, 2005, awarded by the United States Marine Corps.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention is directed to modular harnesses for use with the Multiple Integrated Laser Engagement Systems ("MILES") on various military vehicles for the purpose of adapting the vehicles for simulated military training exercises.

2. Description of the Background Art

The Multiple Integrated Laser Engagement System or "MLES" is used by the United States Armed Forces and other armed forces around the world for training purposes. The current version of the MILES system is referred to as the MILES 2000® system. MILES 2000 is a registered trademark of Cubic Defense Systems, Inc., San Diego, Calif. The MILES system uses lasers and blank cartridges to simulate actual battle. Individual soldiers carry small laser receivers scattered over their bodies, which detect when the soldier has been shined by a firearm's laser. Each laser transmitter is set to mimic the effective range of the weapon on which it is used. Military vehicles are also equipped with various laser transmitters and receivers. When a person is "hit," a medic can use the digital readout to determine which first aid method to practice.

Different versions of MILES systems are available both within the US and internationally. The capabilities of the individual systems can vary significantly but in general all modern systems carry information about the shooter, weapon and ammunition in the laser. When this information is received by the target, the target's MILES system determines the result of the "hit" using a random number roll and a table lookup. As a result a MILES emulating an M-16 rifle cannot kill a tank or armoured personnel carrier (APC), but could still kill a commander visible in the hatch of the vehicle. Vehicles are typically outfitted with a belt of laser sensors while dismounted troops often wear a vest or harness with sensors as well as a "halo" of sensors on their helmets. Often these MILES systems are coupled with a real-time datalink allowing position and event data to be transmitted back to a central site for data collection and display. More sophisticated systems for tanks and APCs exist that use various techniques (including scanning lasers and coupled radio systems) to do more precise targeting of armored vehicles.

MILES equipment is attached to vehicles and personnel and allows troops to simulate real time training exercises without the danger of using live rounds. During an exercise the troops use simulated ammunition, and MILES laser systems simulate rounds being fired. Each vehicle and individual is wired with laser receivers that can detect the pulse fired from the apposing forces laser and determine whether a direct hit was achieve or only a partial kill. By including both vehicles and personnel in the training exercise, troops can get a complete training of various combat situations prior to being deployed. In addition, various scenarios can be included into the training process that provide for more realism.

One of the major setbacks of the current MILES 2000 system that is used on various military vehicles is the cable system that is used to connect the various MILES gear components with one another along with applicable systems in the vehicle. The cables currently in use on the MILES system are manufactured using a process known as "mold in place" and/or "over mold." This harness design does not lend itself to repairs and makes modification of the harness to facilitate additional systems virtually impossible. The current harness is also not modular, which means that when a particular section of the harness is damaged, the entire harness has to be removed from the vehicle and a new one installed. This causes the vehicle to be disengaged from the training exercise while a new harness is installed.

Since military vehicles are used in harsh environments, even during training, damage to the MILES harnesses is quite common. This damage causes the training exercises to be halted and/or delayed while new harnesses are installed. With the existing harness design the entire harness has to be removed and replaced before the vehicle can continue with the training exercise. This involves several personnel and hours to remove and replace the exiting harness with another harness, before the vehicle can resume the training exercise. Also, as new equipment becomes available to enhance the realism of training, integration of this equipment into the existing MILES system is problematic, because the exiting cables do not allow for modification to accept additional capabilities.

Accordingly, there is a need for an improved harness system for use with the MILES system on military vehicles. Such an improved harness system should overcome the disadvantages with the prior art harnesses by providing a series of modular harnesses that are more reliable and user friendly. These harnesses should incorporate the latest technologies in corrosion and contamination prevention. In addition, these harnesses should be designed to be modular in nature, allowing the troubleshooting and replacement of only those subassemblies that have failed or been damaged during training without the disruption of the rest of the systems. They should also be designed with the ability to easily repair damaged sections and to incorporate additional systems and upgrades as they become available without the necessity to build completely new cable.

SUMMARY OF THE INVENTION

The present invention is directed to a modular cable system of harnesses for MILES systems used on various military vehicles for the purpose of simulated training exercises. A harness system in accordance with the present invention is designed to allow the user the ability to troubleshoot and replace certain sections of a harness quicker and easier than previously allowed. The design also allows for the installation of additional systems with some minor modifications. More specifically, the present invention not only makes a harness more reliable product through inherent design, but also allows the user the ability to remove and replace a specific portion of a harness without disrupting the other systems associated with a harness. The quick nature in which a harness can be diagnosed and a specific section can be replaced allows for quicker turn around of vehicles for training exercises. To achieve these advantages and in accordance with the purpose of the invention, as embodied and broadly described, the invention comprises a harness, that is modular in nature and employs the latest technologies in corrosion and contamination resistance. The harness is divided into a number of sub-assemblies that when combined together make up a complete harness assembly for a particular vehicle.

Accordingly, it is an object of the present invention to provide an improved modular harness system for use in adapting military vehicles with the MILES 2000 system.

Another object of the present invention is to provide such a system wherein modular sub-assemblies are provided with corrosion and contamination resistance connectors.

Additional features and advantages of the invention will be set forth in the description which follows and in part will be apparent from the description or may be learned by practice of the invention. The objectives and other advantages of the invention will be realized and attained by the apparatus particularly pointed out in the written description and claims hereof as well as the appended drawings. It is to be understood that the foregoing general description and the following detailed descriptions are exemplary and explanatory and are intended to provide further explanation of the invention as claimed.

BRIEF DESCRIPTION OF THE SEVERAL VIEWS OF THE DRAWINGS

The accompanying drawings are included to provide a further understanding of the invention and are incorporated in and constitute apart of this specification, illustrate several embodiments of the invention and together with the description serve to explain the principles of the invention.

DETAILED DESCRIPTION OF THE INVENTION

Figure 1:
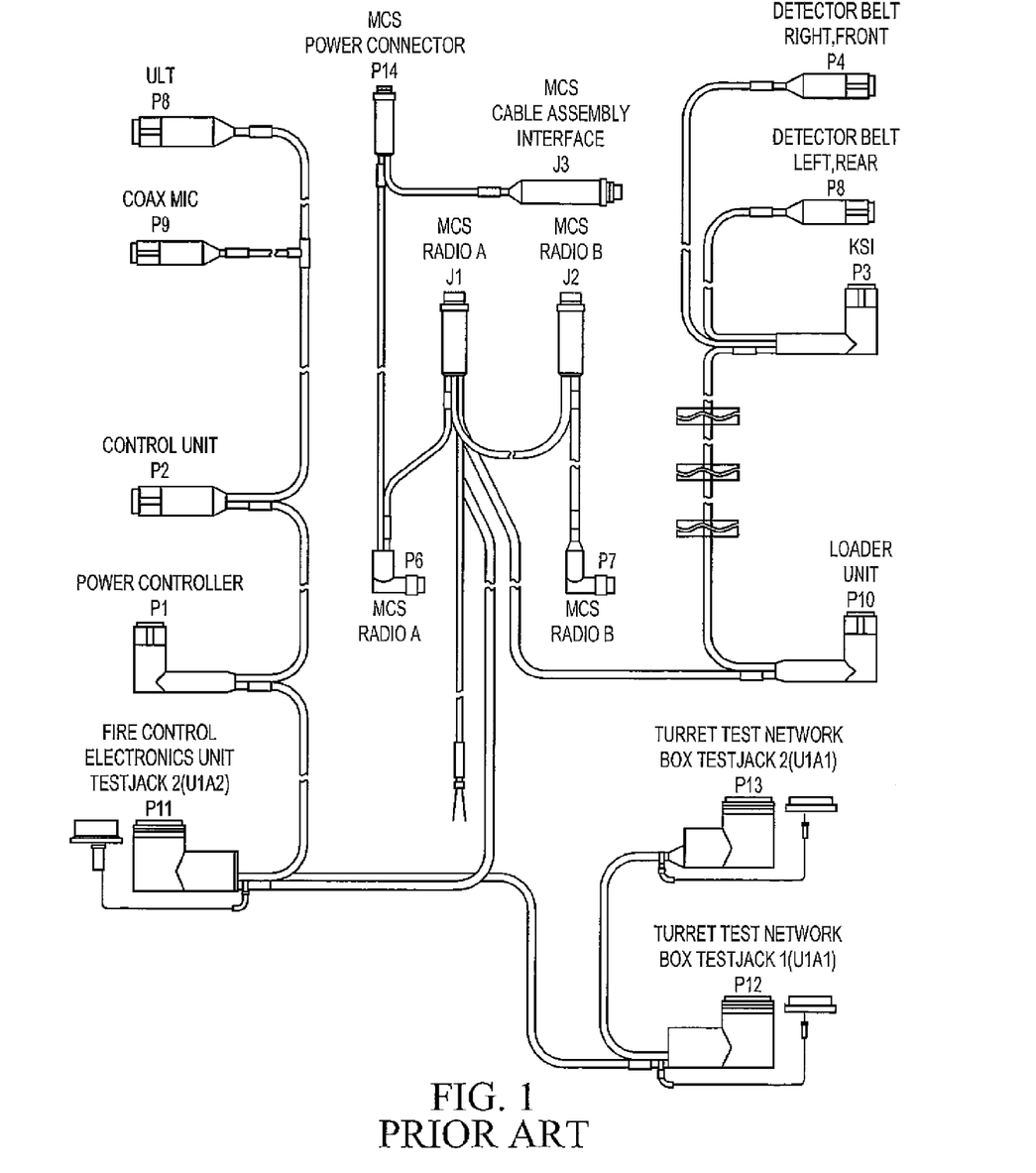
FIG. 1 depicts a prior art cable system for adapting the M1A1/M1A2 main battle tank with the MILES 2000 system.

Both combat vehicles, such as the M1A1 Abrams main battle tank, and various support vehicles can be instrumented using vehicle-specific MILES kits. Vehicle kits typically include a number of hardware components that must be electrically connected by cables. As noted above, the prior art provides a single cable system having multiple branches terminating in connectors for use in connecting the various vehicle hardware components together. These prior art cables are unitary single piece cables manufactured using a process known as "mold in place" and/or "over mold." FIG. 1 depicts a cable system typical of the prior art for adapting the M1A1/M1A2 main battle tank with the MILES 2000 system.

Turning now to the drawings, FIGS. 2-6 depict various embodiments of modular vehicle system cables in accordance with the present invention.

I. M1A1/M1A2 Main Battle Tank

Figure 2:
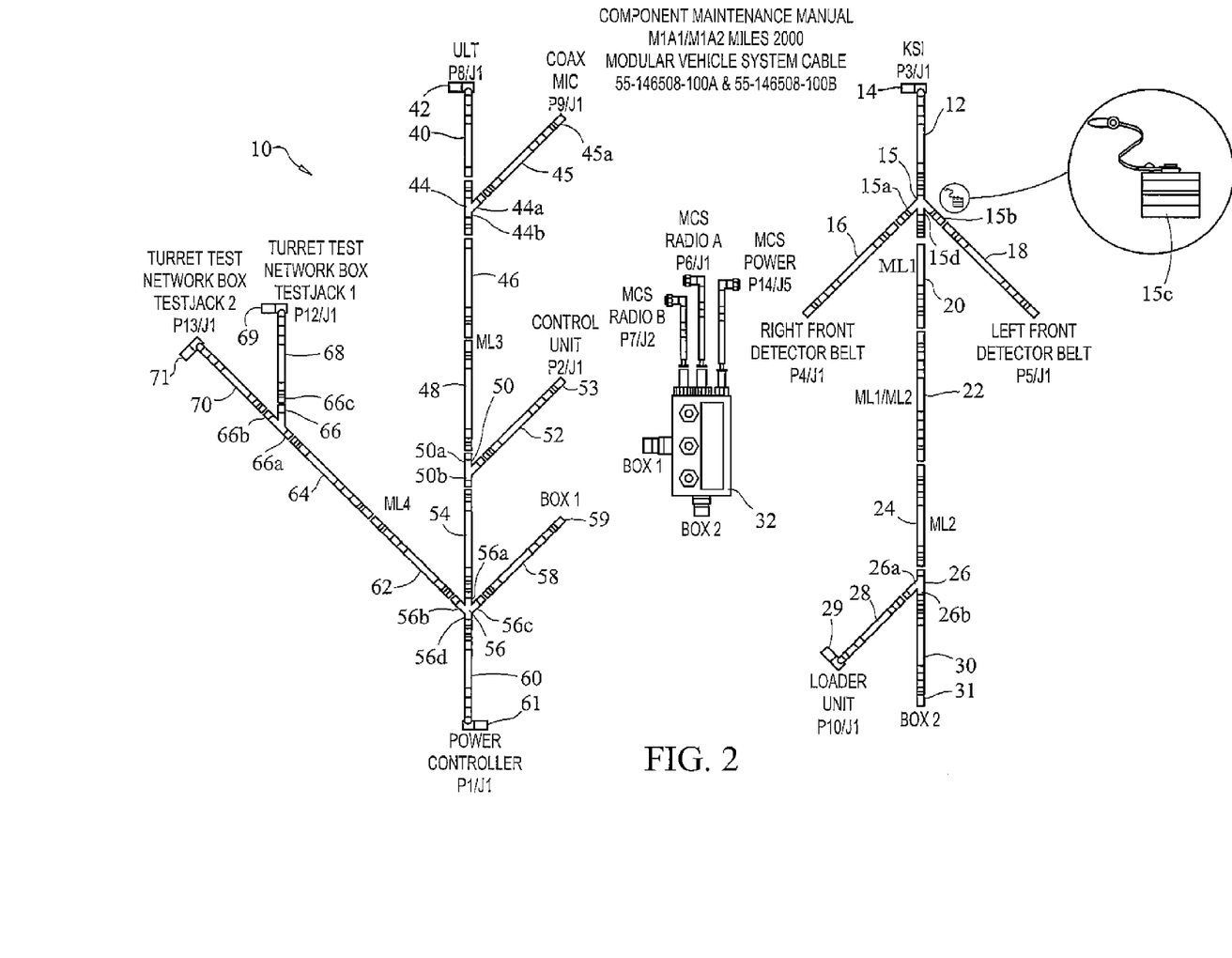
FIG. 2 depicts a modular vehicle system cable for adapting the M1A1 and M1A2 main battle tanks with the MILES 2000 system in accordance with the present invention.

FIG. 2 depicts a modular vehicle cable system, generally referenced as 10, adapted for use with the M1A1 and M1A2 main battle tanks. Modular vehicle cable system 10 includes a modular Kill Status Indicator ("KSI") section 12 having a connector 14 for connection to the model P3 KSI. The P3 KSI is mounted to the exterior of the vehicle on a mast and includes a rotating beacon attached to the top of the mast that strobes when the vehicle has been kit. Connector 14 is connected to the KSI and the modular vehicle cable system 10 is routed to detector belts that receive the laser signal sent from other vehicles when munitions are fired and hit the vehicle. A significant advantage provided by the modular KSI section relates to the ability to allow for the use of conventional and/or wireless detector belts.

KSI section 12 includes a detector belt connector 15 to facilitate connecting connector belts to KSI section 12. Modular detector belt sections, referenced as 16 and 18, are attached to the KSI section 12 via detector belt connector legs 15a and 15b respectively for connection to right and left front detector belts. As noted above, the KSI section is adapted for use with either conventional or wireless detector belts. When using conventional detector belts modular detector belt sections 16 and 18 are connected to connector legs 15a and 15b as seen in FIG. 2. However, when using wireless detector belts modular sections 16 and 18 are omitted and the connecting points at 15a and 15b are capped using belt connector caps 15c.

Detector belt connector 15 includes an connecting point 15d that is connected to additional series connected modular sections, referenced as 20, 22, and 24 as seen in FIG. 2. Modular section 24 is connected to a Y-connector 26 having a first leg 26a and a second leg 26b. First leg 26a is connected to a loader unit section 28 that in turn has an end connector 29 connected to an input on the vehicle and functions to disengage the main gun on the M1A1/M1A2 main battle tank as there are no "blank" rounds for the main gun of the tank. Accordingly, firing of the main gun is simulated through the MILES system alone. Second leg 26b is connected to a control box 32 via a control box section 30 and end connector 31. The control box is interfaced with vehicle radio and power systems to facilitate disabling of the radios and power in response to "damage" resulting from simulated "hits".

The M1A1/M1A2 tanks are further adapted with a Universal Laser Transmitter ("ULT") that sends a laser signal from the vehicle to opposing vehicles every time the system is fired. The ULT fires a laser beam pulse with encoded information that describes the weapon system employed along with the applicable munitions. Upon hitting a laser detector belt, this code is deciphered and the information factored into events that then determine the outcome and condition of the hit vehicle. Accordingly, the modular vehicle cable system 10 further includes a ULT section 40 having an end connector 42 adapted for direct connection to the ULT unit. ULT section 40 is connected to a Y-connector 44 having additional connector legs 44a and 44b. Connector leg 44a provides a connection point for modular cable section 45 that has an end connector 45a connected to a P9 Coax Microphone that picks up the sound of a machine gun as it fires blank rounds. When the machine gun fires blank rounds, the microphone picks up the sound and sends a signal through the MILES system cable to the loader unit that automatically deducts the rounds fired. Connector leg 44b is connected to modular sections 46 and 48 as seen in FIG. 2. Connector leg 48 is connected to a Y-shaped connector 50 having first and second legs, referenced as 50a and 50b. First leg 50a is connected to a control unit section 52 that having an end connector 53 that is typically connected to a control unit that provides the vehicle commander with critical information regarding weapons firing and available ammunition as well as weapons control functions. Connector leg 50b is connected to a modular section 54 that is connected to a multi-connector 56, having connection legs 56a, 56b, 56c, and 56d as seen in FIG. 2. A modular connector 58 is connected to connection leg 56c, and has a connector end 59 connected to box 30. A modular connector 60 is connected to connection leg 56d, and has a connector end 61 connected to a power controller that controls power to the vehicle systems while further including a battery power supply to maintain functionality of certain MILES systems, such as the KSI strobe, even after the vehicle is killed.

Finally, a series of modular sections referenced as 62 and 64 are connected in series from connection leg 56b of multi-connector 56 to connector leg 66a of Y-shaped connector 66 having connection legs 66a, 66b, and 66c as seen in FIG. 2. Additional modular sections 68 and 70 are provided for connection to turret test networks test jacks 1 and 2. More particularly, section 68 has a first end connected to leg 66c of multi-connector 60 and a second connector end 69 connected to turret test network 1, while section 70 has a first end connected to leg 66b of multi-connector 60 and a second connector end 71 connected to turret test network 2.

As should now be apparent, a significant aspect of the present invention relates to the modular aspect of the harness. By providing a modular harness troubleshooting is simplified, and individual harness sections and sub-assemblies may be easily removed and replaced without requiring that the removal and replacement of the entire modular vehicle cable system. More particularly, the modular vehicle cable system of the present invention has proven effective to allow for interchangeability of the various sections and sub-assemblies used on the MILES 2000 vehicle systems. Accordingly, various modular cable sections and connectors capable of being used as replacement parts for corresponding similar sections and connectors. As a result of the interchangeability of the sub-assemblies, modular sections, and connectors, the spare parts inventory required to service a fleet of MILES enabled vehicles is significantly reduced.

An additional significant aspect of the present invention relates to the use of aluminum connectors that meet the requirements of military specifications. The connectors have added strength, reduce overall weight and increase corrosion resistance. More particularly, the connectors use gold plated pins and sockets which increase conductivity as well as corrosion resistance. In addition, the wire used in the harness assembly may comprise silver coated copper, instead of the tin coated wires used in the prior art harnesses. Furthermore, the harness incorporates sealing thermal fit tubing with an adhesive lining to seal all openings in the joints at various transition areas of the harness. By covering various transition areas of the harness, not only are these areas protected against moisture contamination, but also added strain relief is provided to help against damage from servicing and vibration.

A further significant aspect of the present invention relates to the incorporation of abrasion resistant thermal tubing on portions of the modular vehicle cables. More particularly, cable system 10 may include an external layer of neoprene-type material that provides an outer layer of abrasion resistant material for shielding the underlying tubular cable structure from abrasion, as well as resistance to weather and chemicals. The ability to shield portions of the harness from abrasion and contamination is considered particularly important since the present inventor has discovered that repeated movement of the vehicle and various gun systems can cause the cables to rub against portions of the vehicle thereby leading to failure.

The modular vehicle cable system 10 of the present invention is further adapted to include part number identification labels such that each sub-assembly is easily identifiable. Labeling each sub-assembly with an identification label is considered particularly important given the modular nature of the wiring harness of the present invention as each of the above-referenced sub-assemblies may be disconnected and removed from the vehicle.

II. AAV-P7 Amphibious Assault Vehicle

Figure 3:
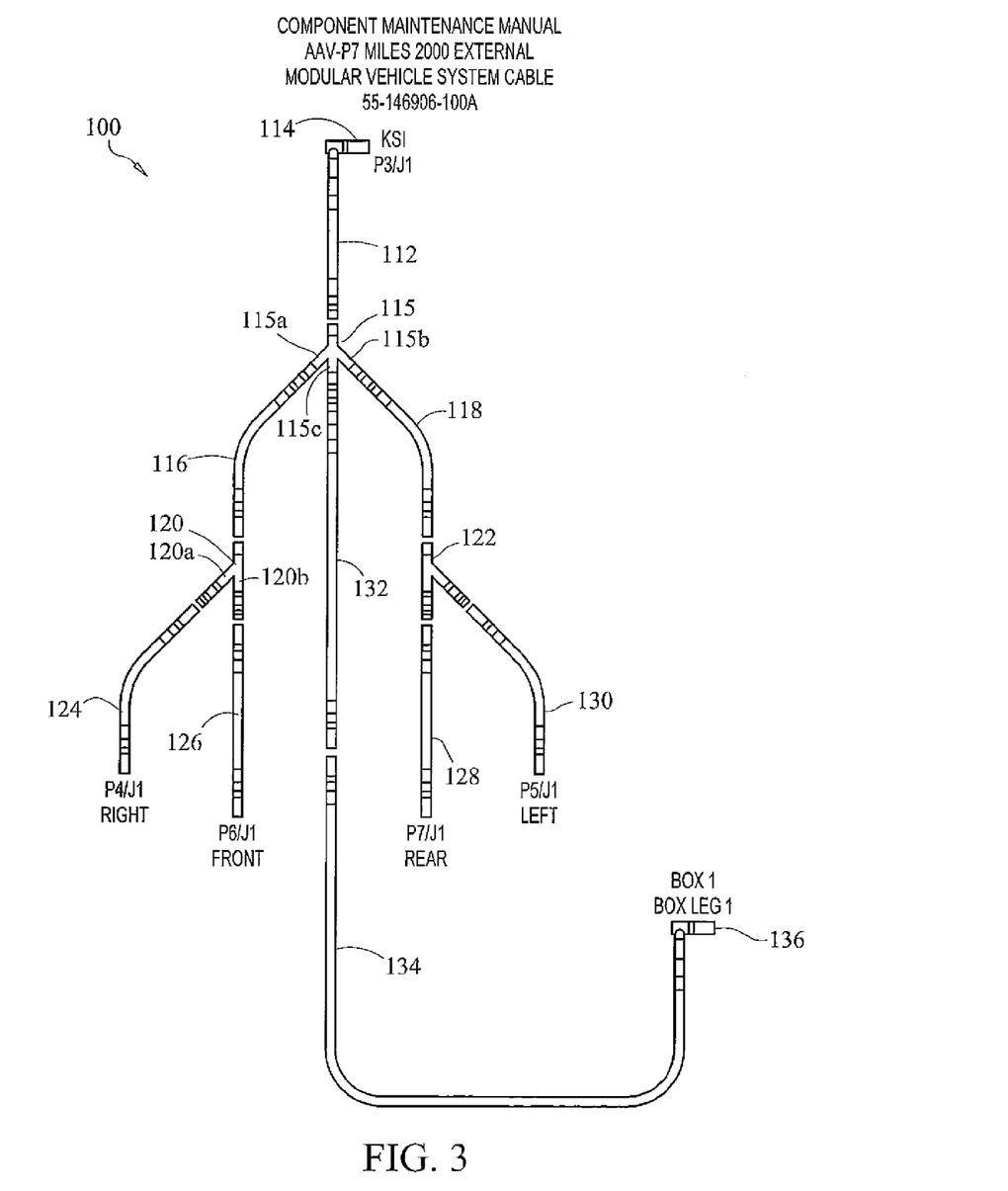
FIGS. 3 and 4 depict internal and external modular vehicle system cables for adapting the AAV-P7 Amphibious Assault Vehicle with the MILES 2000 system in accordance with the present invention.
Figure 4:
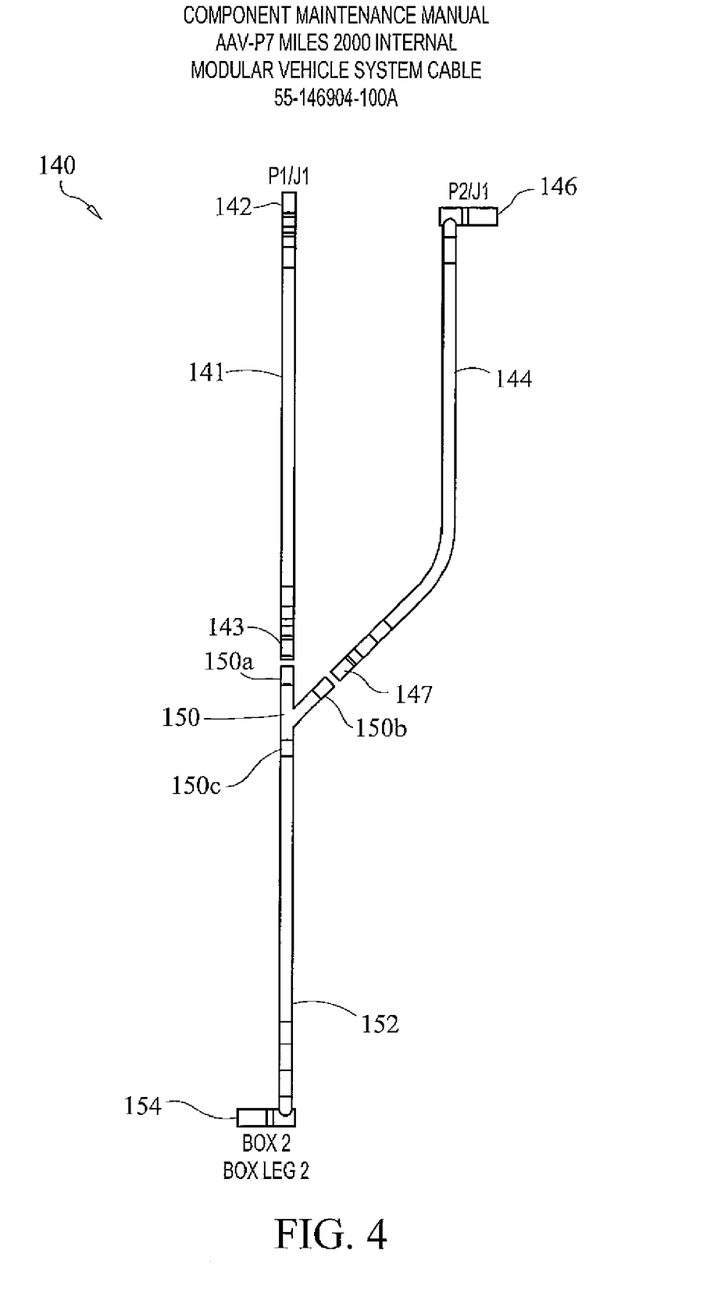

FIGS. 3 and 4 depict a modular vehicle cable system in accordance with the present invention adapted for use on the AAV-P7 Amphibious Assault Vehicle. Turning first to FIG. 3 modular vehicle cable system includes an external cable system, generally referenced as 100, having a modular Kill Status Indicator ("KSI") section 112 including a terminal end connector 114 for connection to the model P3 KSI. The P3 KSI is mounted to the exterior of the vehicle on a mast and includes a rotating beacon attached to the top of the mast that strobes when the vehicle has been kit. Connector 114 is connected to the KSI and the modular vehicle cable system is routed to detector belts that receive the laser signal sent from other vehicles when munitions are fired and hit the vehicle. A significant advantage provided by the modular KSI section relates to the ability to allow for the use of conventional and/or wireless detector belts.

KSI section 112 includes a detector belt connector 115 to facilitate connecting connector belts to KSI section 112. Modular detector belt sections, referenced as 116 and 118, are attached to the KSI section 112 via detector belt connector legs 115a and 115b respectively for connection to various detector belts. In this embodiment each modular detector belt section 116 and 118 is connected to a Y-shaped connector, referenced as 120 and 122 respectively. Each Y-shaped connector 120 and 122 includes dual connection legs for connection to right and front laser detection belts. More particularly, Y-shaped connector 120 includes connection legs 120a and 120b, which are intended for connection to right and front mounted laser detection belts via modular sections 124 and 126 respectively. Similarly, Y-shaped connector 122 includes connection legs 122a and 122b, which are adapted for connection to rear and left mounted laser detection belts via modular sections 128 and 130. Detector belt connector 115 includes an third leg 115c that is connected to a modular section 132, which in turn is connected in series to connector 134 having an end connector 136 for connection to a control box (not shown). As noted above, the KSI section may be adapted for use with either conventional or wireless detector belts as disclosed herein above.

As illustrated in FIG. 4, the modular vehicle cable system adapted for use with the AAV-P7 amphibious assault vehicle includes an internal system, generally referenced as 140, including a power controller section 141 having an end connector 142 adapted for connection to a power controller that controls power to the vehicle systems while further including a battery power supply to maintain functionality of certain MILES systems, such as the KSI strobe, even after the vehicle is killed. In addition, the internal system includes a control unit section 144 having an end connector 146 adapted for connection to a control unit that provides the vehicle commander with critical information regarding weapons firing and available ammunition as well as weapons control functions. The power controller section 141 and control unit section 144 each have opposing end connectors, referenced as 143 and 147 respectively, adapted for connection to legs 150a and 150b of a Y-shaped connector 150. A third leg 150c is connected to a modular section 152 having an end connector 154 for connection to the control box (not shown).

III. LAV-25 Light Armored Vehicle

Figure 5:
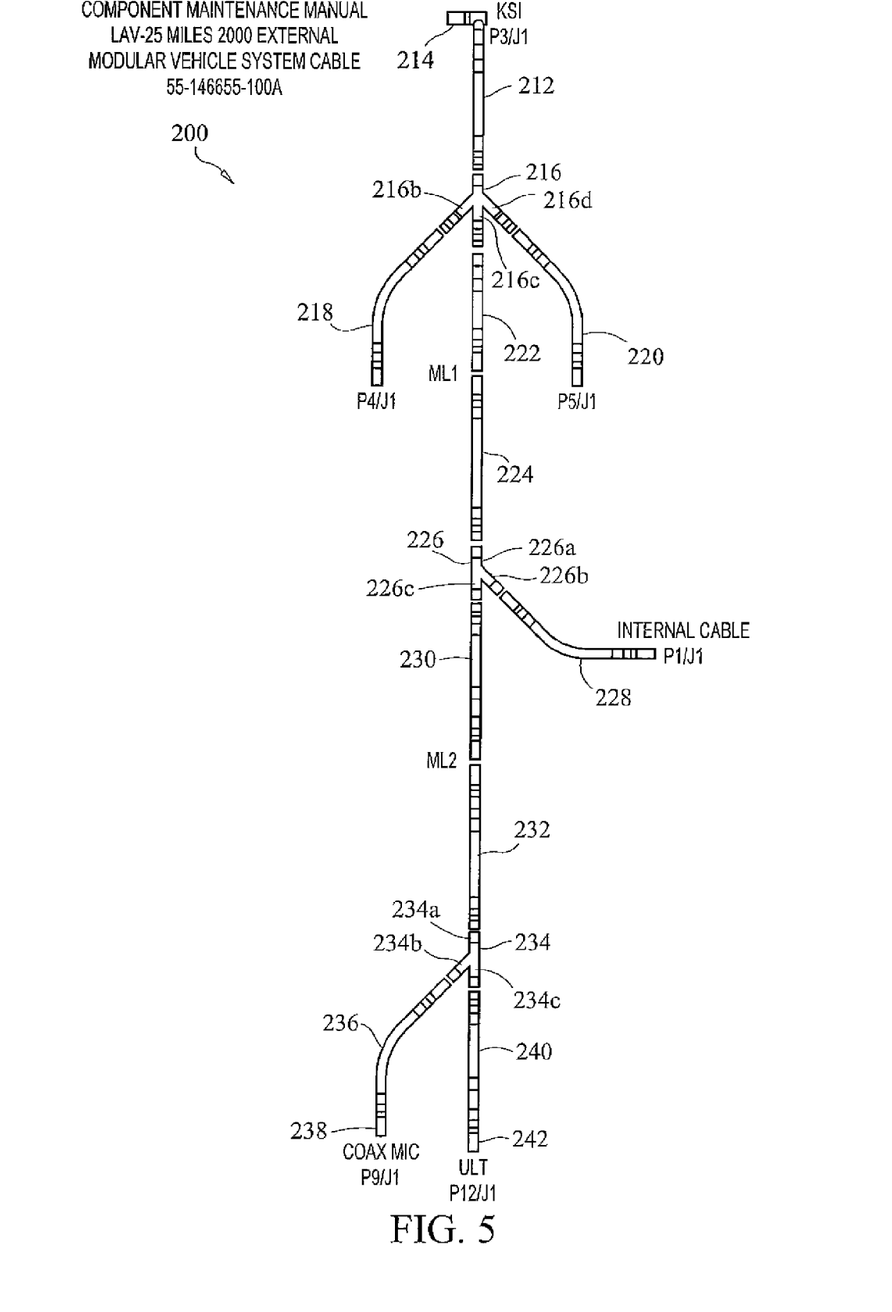
FIGS. 5 and 6 depict internal and external modular vehicle system cables for adapting the LAV-25 Light Armored Vehicle with the Miles 2000 system in accordance with the present invention.
Figure 6:
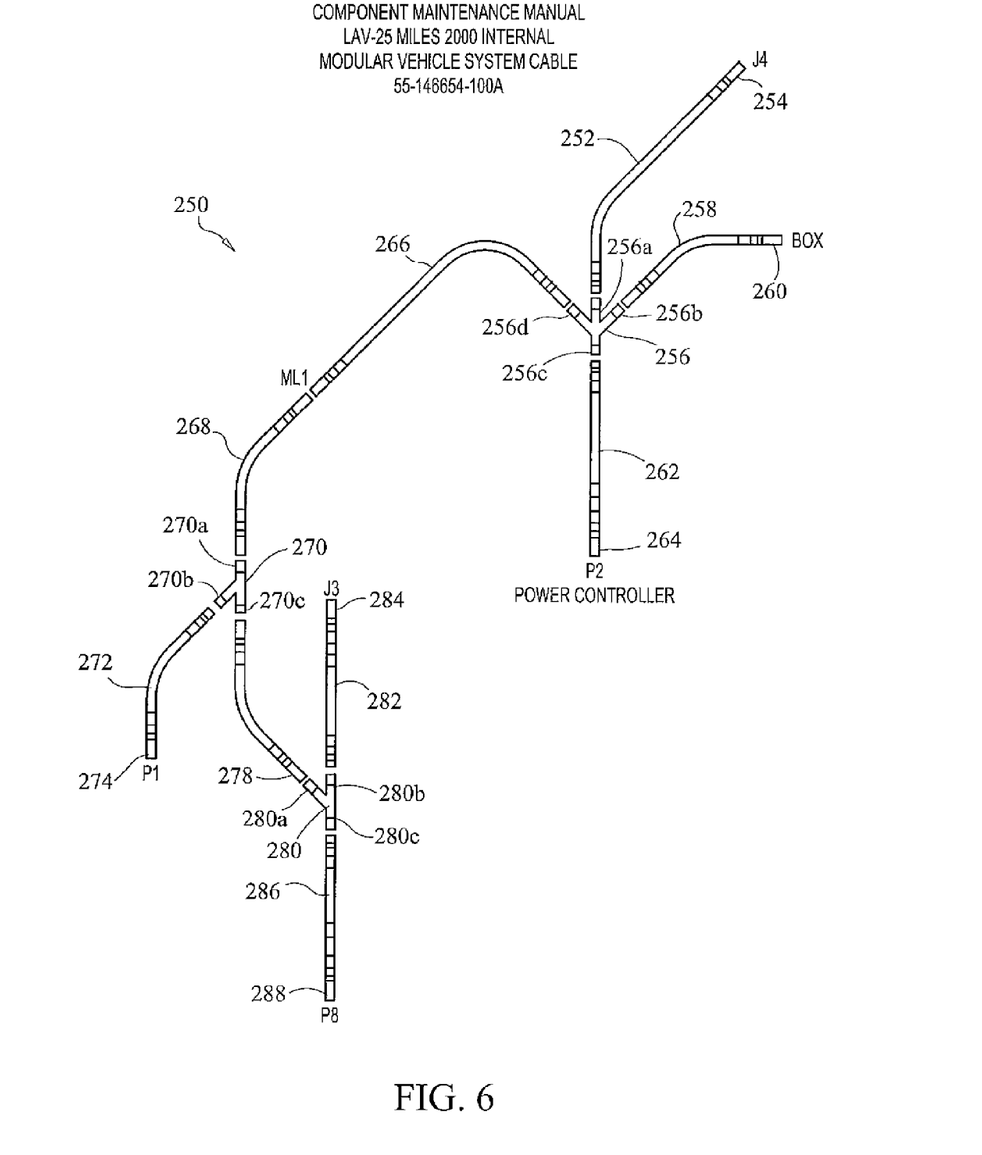

FIGS. 5 and 6 depict a modular vehicle cable system in accordance with the present invention adapted for use on the LAV-25 Light Armored Vehicle. The modular vehicle cable system for the LAV-25 Light Armored Vehicle includes external and internal cable systems, referenced as 200 and 250 respectively, as seen in FIGS. 5 and 6 respectively. Turning first to FIG. 5 modular vehicle cable system includes an external cable system 200 having a modular Kill Status Indicator ("KSI") section 212 having a connector 214 for connection to the model P3 KSI. The P3 KSI is mounted to the exterior of the vehicle on a mast and includes a rotating beacon attached to the top of the mast that strobes when the vehicle has been kit. Connector 214 is connected to the KSI and the modular vehicle cable system is routed to detector belts that receive the laser signal sent from other vehicles when munitions are fired and hit the vehicle. A significant advantage provided by the modular KSI section relates to the ability to allow for the use of conventional and/or wireless detector belts.

As seen in FIG. 5, KSI section 212 is connected to connection leg 216a of multi-connector 216. Multi-connector 216 further includes connection legs 216b, 216c, and 216d. Connection legs 216b and 216c provide connection points for cable sections 218 and 220 that are in turn connected to right and left externally mounted laser detection belts (not shown). Connection leg 216c of multi-connector 216 is connected to modular sections 222 and 224 as seen in FIG. 5. Modular section 224 is connected to Y-shaped connector 226 as connector leg 226a. As further depicted in FIG. 5, connector leg 226b provides a connection leg for modular section 228 that is routed internally for connection to the internal modular cable system in order for the signals to be completed. This connection is exclusive to the LAV-25 vehicle and completes the circuit for the external and internal harness assemblies. Connector leg 226c provides a connection leg for series connected modular cable sections 230 and 232. Modular cable section 232 is connected to Y-shaped connector 234 at connection leg 234a. Connector 234 further provides connection legs 234b and 234c. Connection leg 234b provides a connection point for modular cable section 236 that has an end connector 238 connected to a P9 Coax Microphone that picks up the sound of a machine gun as it fires blank rounds. Connection leg 234c provides a connection point for modular cable section 240 having an end connector 242 for connection to a Universal Laser Transmitter.

FIG. 6 depicts the internal modular cable system 250 for the LAV-25 Light Armored Vehicle. As seen in FIG. 6, internal modular cable system 250 includes a modular cable section 252 having an end connector 254 for connection to internal cable section 228. Cable section 252 is connected at its opposite end to a multi-leg connector 256 at leg 256a. Multi-leg connector 256 further includes connection legs 256b, 256c, and 256d. Connection leg 256b provides a connection point for modular cable 258 having an end connector 260 for connection to a system control box (not shown). Connection leg 256c provides a connection point for modular cable section 262 having an end connector 264 for connection to a power controller. Connection leg 256d provides a connection point for series connected modular cable sections 266 and 268 as seen in FIG. 6. Modular cable section 268 is connected to a Y-shaped connector 270 at connector leg 270a. Connector 270 further includes connector legs 270b and 270c. Connector leg 270b provides a connection point for modular cable section 272 having a terminal end connector 274 for connection to a MILES vehicle control unit. Connector leg 270c provides a connection point for modular cable 276 having a terminal end connector 278 connected to connection leg 280a of Y-shaped connector 280. Connector 280 further includes connector legs 280b and 280c. Connector leg 280b provides a connection point for modular cable 282 having a terminal end connector 284 for connection to the vehicle turret network. Connector leg 280c provides a connection point for modular cable 286 having a terminal end connector 288 for connection to the vehicle turret network.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What I claim is:

1. A modular cable system for use with a military vehicle configured with a multiple integrated laser engagement system having a kill status indicator, at least one laser detector, a power controller, and a control unit, said modular cable system comprising:
   a first modular cable assembly electrically connected to the kill status indicator;
   a second modular cable assembly electrically connected to the at least one laser detector;
   a third modular cable assembly electrically connected to the power controller;
   a fourth modular cable assembly electrically connected to the control unit; and
   each of said modular cable assemblies being electrically connected to at least one of said other modular cable assemblies.

2. A modular cable system according to claim 1, further including a fifth modular cable assembly electrically connected to a universal laser transmitter.

3. A modular cable system according to claim 1, further including a sixth modular cable assembly electrically connected to a microphone.

4. A modular cable system according to claim 1, further including a seventh modular cable assembly electrically connected to a turret test network.

5. A modular cable system according to claim 1, further including an eighth modular cable assembly electrically connected to a loader unit.

6. A modular cable system according to claim 1, further including a ninth modular cable assembly electrically connected to a control box.

7. A modular cable system according to claim 1, wherein said second modular cable assembly is in wireless communication with a remote wireless laser detector.

8. A modular cable system for use with a military vehicle configured with a multiple integrated laser engagement system comprising:
- a military vehicle having a kill status indicator, at least one laser detector, a power controller, a control unit, a laser transmitter, a microphone, a turret test network, and a loader unit;
- a first modular cable assembly electrically connected to said kill status indicator;
- a second modular cable assembly electrically connected to said at least one laser detector;
- a third modular cable assembly electrically connected to said power controller;
- a fourth modular cable assembly electrically connected to said control unit;
- a fifth modular cable assembly electrically connected to said universal laser transmitter;
- a sixth modular cable assembly electrically connected to said microphone;
- a seventh modular cable assembly electrically connected to said turret test network;
- an eighth modular cable assembly electrically connected to said loader unit; and
- each of said modular cable assemblies being electrically connectable to at least one of said other modular cable assemblies.

9. In a military vehicle having a multiple integrated laser engagement system with at least one laser detection sensor, a kill status indicator, a control unit, and a power controller for configuring the vehicle for simulated combat, the improvement comprising a modular cable system including: (a) a first modular cable assembly electrically connected to the kill status indicator; (b) a second modular cable assembly electrically connected to the at least one laser detector; (c) a third modular cable assembly electrically connected to the power controller; (d) a fourth modular cable assembly electrically connected to the control unit; and (e) each of said modular cable assemblies being electrically connected to at least one of said other modular cable assemblies.

* * * * *